United States Patent
Sharif et al.

(10) Patent No.: US 7,245,291 B2
(45) Date of Patent: Jul. 17, 2007

(54) SYSTEM AND METHOD FOR INTERNET APPLIANCE DATA ENTRY AND NAVIGATION

(76) Inventors: Imran Sharif, 554 Valley Way, Milpitas, CA (US) 95035; Noor A Kadir, 11, Mohakhali C/A, (3rd Floor), Dhaka (BD) 1212; Glen Edward Ivey, 29701 Hwy. 20, Ft. Bragg, CA (US) 95437; Noman Waseq, 37512 Chauntry Common, Fremont, CA (US) 94536; William Knapp, 10761 Ridge View Ave., San Jose, CA (US) 95127; John Bremsteller, 3020 Country Sq., (Suite # 2126, Carrollton, TX (US) 75006

( * ) Notice: Subject to any disclaimer, the term of this patent is extended or adjusted under 35 U.S.C. 154(b) by 713 days.

(21) Appl. No.: 09/901,544

(22) Filed: Jul. 8, 2001
(Under 37 CFR 1.47)

(65) Prior Publication Data
US 2002/0077143 A1 Jun. 20, 2002

Related U.S. Application Data

(60) Provisional application No. 60/217,628, filed on Jul. 11, 2000, provisional application No. 60/217,627, filed on Jul. 11, 2000, provisional application No. 60/217,626, filed on Jul. 11, 2000.

(51) Int. Cl.
*G09G 5/00* (2006.01)

(52) U.S. Cl. ..................... 345/172; 345/168; 345/173; 345/174; 345/179

(58) Field of Classification Search ............... 345/156, 345/162, 168, 172–180, 733, 734, 751, 753, 345/619; 709/217; 715/500, 702, 535; 348/173; 379/88.15; 455/563; 341/175; 235/462.01, 235/254, 472.01; 250/222; 710/67; 725/135
See application file for complete search history.

(56) References Cited

U.S. PATENT DOCUMENTS

| | | |
|---|---|---|
| 4,405,829 A | 9/1983 | Rivest et al. |
| 4,549,279 A | 10/1985 | Lapeyre |
| 4,590,470 A | 5/1986 | Koenig |

(Continued)

OTHER PUBLICATIONS

Ruel.Net Set Top Page Interactive TV Top.Box.News 1998.*

(Continued)

*Primary Examiner*—Bipin Shalwala
*Assistant Examiner*—Prabodh Dharia
(74) *Attorney, Agent, or Firm*—Robert Buckley

(57) ABSTRACT

A system for Internet appliance data entry and navigation includes a reduced keyset remote control unit transmitting a user input keystroke sequence. An Internet appliance receives and parses the keystroke sequence, placing the parsed data into an input buffer. An Internet appliance browser accesses user interface display screens from remote storage via a communications network. The buffer contents define a window within an accessed display screen. The Internet appliance converts the composite display screen for output to a standard television receiver. A user makes option choices and navigates the user interface display screens by activating hyperlinks within the accessed display screens. A standard telephone keypad arrangement is used to create the keystroke sequence, permitting use of a standard or wireless telephone and a hand-held remote control unit for system input and control. An alternative embodiment permits voice input of text, numbers, special symbols, and shortcuts in many languages.

20 Claims, 8 Drawing Sheets

U.S. PATENT DOCUMENTS

| | | | |
|---|---|---|---|
| 4,985,863 A | 1/1991 | Fujisawa et al. | |
| 5,155,847 A | 10/1992 | Kirouac et al. | |
| 5,206,905 A | 4/1993 | Lee et al. | |
| 5,298,681 A | 3/1994 | Swift et al. | |
| 5,485,622 A | 1/1996 | Yamaki | |
| 5,524,195 A | 6/1996 | Clanton, III et al. | |
| 5,708,776 A | 1/1998 | Kikinis | |
| 5,761,436 A | 6/1998 | Nielsen | |
| 5,761,682 A * | 6/1998 | Huffman et al. | 715/500 |
| 5,764,731 A * | 6/1998 | Yablon | 379/88.15 |
| 5,809,251 A | 9/1998 | May et al. | |
| 5,819,292 A | 10/1998 | Hitz et al. | |
| 5,826,015 A | 10/1998 | Schmidt | |
| 5,844,552 A | 12/1998 | Gaughan et al. | |
| 5,847,697 A | 12/1998 | Sugimoto | |
| 5,874,939 A | 2/1999 | Galvin | |
| 5,889,949 A | 3/1999 | Charles | |
| D411,534 S | 6/1999 | Lepack et al. | |
| 5,909,540 A | 6/1999 | Carter et al. | |
| 5,918,229 A | 6/1999 | Davis et al. | |
| 5,937,380 A | 8/1999 | Segan | |
| 5,940,074 A | 8/1999 | Britt, Jr. et al. | |
| 5,949,492 A * | 9/1999 | Mankovitz | 348/473 |
| 5,953,541 A * | 9/1999 | King et al. | 710/67 |
| 5,960,411 A | 9/1999 | Hartman et al. | |
| 5,983,227 A | 11/1999 | Nazem et al. | |
| 5,983,262 A | 11/1999 | Kukkal | |
| 5,987,506 A | 11/1999 | Carter et al. | |
| 5,987,621 A | 11/1999 | Duso et al. | |
| 5,995,540 A | 11/1999 | Draganic | |
| 5,995,943 A | 11/1999 | Bull et al. | |
| 5,999,950 A * | 12/1999 | Krueger et al. | 715/535 |
| 6,005,476 A | 12/1999 | Valiulis | |
| 6,005,563 A | 12/1999 | White et al. | |
| 6,006,034 A | 12/1999 | Heath et al. | |
| 6,009,524 A | 12/1999 | Olarig et al. | |
| 6,011,554 A | 1/2000 | King et al. | |
| 6,018,345 A | 1/2000 | Berstis | |
| 6,021,399 A | 2/2000 | Demers et al. | |
| 6,021,418 A | 2/2000 | Brandt et al. | |
| 6,026,474 A | 2/2000 | Carter et al. | |
| 6,029,175 A | 2/2000 | Chow et al. | |
| 6,038,570 A | 3/2000 | Hitz et al. | |
| 6,041,346 A | 3/2000 | Chen et al. | |
| 6,049,835 A | 4/2000 | Gagnon | |
| 6,052,367 A | 4/2000 | Bowater et al. | |
| 6,052,696 A | 4/2000 | Euler et al. | |
| 6,052,725 A | 4/2000 | McCann et al. | |
| 6,055,566 A | 4/2000 | Kikinis | |
| 6,061,659 A | 5/2000 | Murray | |
| 6,061,668 A | 5/2000 | Sharrow | |
| 6,061,740 A | 5/2000 | Ferguson et al. | |
| 6,064,449 A | 5/2000 | White et al. | |
| 6,065,043 A | 5/2000 | Domenikos et al. | |
| 6,065,049 A | 5/2000 | Beser et al. | |
| 6,065,061 A | 5/2000 | Blahut et al. | |
| 6,067,098 A | 5/2000 | Dye | |
| 6,067,582 A | 5/2000 | Smith et al. | |
| 6,069,310 A | 5/2000 | James | |
| 6,070,174 A | 5/2000 | Starek et al. | |
| 6,070,191 A | 5/2000 | Narendran et al. | |
| 6,072,861 A | 6/2000 | Yu | |
| 6,073,168 A | 6/2000 | Mighdoll et al. | |
| 6,073,171 A | 6/2000 | Gaughan et al. | |
| 6,073,177 A | 6/2000 | Hebel et al. | |
| 6,073,214 A | 6/2000 | Fawcett | |
| 6,074,434 A | 6/2000 | Cole et al. | |
| 6,075,568 A | 6/2000 | Matsuura | |
| 6,076,168 A | 6/2000 | Fiveash et al. | |
| 6,076,734 A | 6/2000 | Dougherty et al. | |
| 6,078,757 A | 6/2000 | Saito et al. | |
| 6,078,886 A | 6/2000 | Dragosh et al. | |
| 6,078,929 A | 6/2000 | Rao | |
| 6,078,954 A | 6/2000 | Lakey et al. | |
| 6,078,961 A | 6/2000 | Mourad et al. | |
| 6,080,207 A | 6/2000 | Kroening et al. | |
| 6,081,835 A | 6/2000 | Antcliff et al. | |
| 6,081,837 A | 6/2000 | Stedman et al. | |
| 6,084,859 A | 7/2000 | Ratcliff et al. | |
| 6,085,126 A | 7/2000 | Mellgren, III et al. | |
| 6,085,171 A | 7/2000 | Leonard | |
| 6,085,195 A | 7/2000 | Hoyt et al. | |
| 6,085,321 A | 7/2000 | Gibbs et al. | |
| 6,088,544 A | 7/2000 | Saito et al. | |
| 6,092,078 A | 7/2000 | Adolfsson | |
| 6,094,277 A | 7/2000 | Toyoda | |
| 6,096,096 A | 8/2000 | Murphy et al. | |
| 6,097,383 A | 8/2000 | Gaughan et al. | |
| 6,098,056 A | 8/2000 | Rusnak et al. | |
| 6,098,086 A * | 8/2000 | Krueger et al. | 715/535 |
| 6,098,089 A | 8/2000 | O'Connor et al. | |
| 6,101,472 A | 8/2000 | Giangarra et al. | |
| 6,101,473 A | 8/2000 | Scott et al. | |
| 6,101,548 A | 8/2000 | Okada | |
| 6,104,334 A * | 8/2000 | Allport | 341/175 |
| 6,104,373 A | 8/2000 | Klein | |
| 6,108,629 A | 8/2000 | Kasday | |
| 6,108,637 A | 8/2000 | Blumenau | |
| 6,108,703 A | 8/2000 | Leighton et al. | |
| 6,112,176 A | 8/2000 | Goldenthal et al. | |
| 6,115,030 A | 9/2000 | Berstis et al. | |
| 6,118,230 A | 9/2000 | Fleischmann | |
| 6,119,088 A | 9/2000 | Ciluffo | |
| 6,119,155 A | 9/2000 | Rossmann et al. | |
| 6,119,244 A | 9/2000 | Schoenthal et al. | |
| 6,199,204 B1 | 3/2001 | Donohue | |
| 6,202,060 B1 * | 3/2001 | Tran | 707/3 |
| 6,212,408 B1 * | 4/2001 | Son et al. | 455/563 |
| 6,281,880 B1 * | 8/2001 | Rose et al. | 345/158 |
| 6,348,932 B1 * | 2/2002 | Nishikawa et al. | 715/719 |
| 6,400,996 B1 * | 6/2002 | Hoffberg et al. | 700/83 |
| 6,456,275 B1 * | 9/2002 | Hinckley et al. | 345/156 |
| 6,496,981 B1 * | 12/2002 | Wistendahl et al. | 725/112 |
| 6,501,463 B1 * | 12/2002 | Dahley et al. | 345/173 |
| 6,510,461 B1 * | 1/2003 | Nielsen | 709/224 |
| 6,622,917 B1 * | 9/2003 | Knowles | 235/462.01 |
| 6,631,523 B1 * | 10/2003 | Matthews et al. | 725/53 |
| 6,675,204 B2 * | 1/2004 | De Boor et al. | 709/217 |
| 6,707,027 B2 * | 3/2004 | Liess et al. | 250/221 |
| 6,771,283 B2 * | 8/2004 | Carro | 715/702 |
| 6,802,041 B1 * | 10/2004 | Rehm | 715/500.1 |
| 6,850,252 B1 * | 2/2005 | Hoffberg | 715/716 |
| 6,938,101 B2 * | 8/2005 | Hayes et al. | 710/5 |
| 6,993,594 B2 * | 1/2006 | Schneider | 709/245 |
| 2001/0003177 A1 * | 6/2001 | Schena et al. | 705/27 |
| 2002/0019784 A1 * | 2/2002 | Ritz | 705/26 |
| 2002/0056136 A1 * | 5/2002 | Wistendahl et al. | 725/135 |
| 2002/0067334 A1 * | 6/2002 | Hinckley et al. | 345/156 |
| 2003/0009528 A1 * | 1/2003 | Sharif et al. | 709/206 |
| 2003/0040962 A1 * | 2/2003 | Lewis | 705/14 |
| 2003/0229900 A1 * | 12/2003 | Reisman | 725/87 |
| 2004/0031058 A1 * | 2/2004 | Reisman | 725/112 |
| 2004/0117831 A1 * | 6/2004 | Ellis et al. | 725/53 |
| 2005/0198677 A1 * | 9/2005 | Lewis | 725/87 |

OTHER PUBLICATIONS

The Durango Herald Dec. 5, 2000, Editor.*
About Web TV Spirit works software Dev, 1999.*
EE tinmes voice interface gain in info appliance May 31, 2000.*
Web Monkey, Web Developer Research Jeffery Veen 1996.*

* cited by examiner

SYSTEM AND METHOD FOR INTERNET APPLIANCE DATA ENTRY AND NAVIGATION

RELATED APPLICATIONS

This patent application is related to each of the following U.S. patent applications and provisional patent applications, all filed on Jul. 8, 2001, and under an obligation of assignment to UNIQA, Inc.: U.S. Provisional Patent Application 60/304,009 for "Voice Annotation System and Method," U.S. Provisional Patent Application 60/304,002 for "Method and Apparatus for Dynamically Changing A User Interface In An Internet Appliance," U.S. Provisional Patent Application 60/303,982 for "System and Method for Peer-to-Peer Exchanges of Digital Content Files Using An Internet Appliance," U.S. Patent Application 09/901,405 for "System and Method for Using an Internet Appliance to Send/Receive Digital Content Files as E-mail Attachments," and U.S. Provisional Patent Application 60/304,001 for "System and Method for Password Generation and for Digital Certificate Creation and Authentication," This patent application is also related to each of the following provisional patent applications, all filed on Jul. 11, 2000, and under an obligation of assignment to UNIQA, Inc.: U.S. Provisional Patent Application No. 60/217,626 for "Internet Appliance for Interactive Audio/Video Display Using A Remote Control Unit for User Input"; U.S. Provisional Patent Application No. 60/217,627 for "Fax-Compatible Internet Appliance"; and U.S. Provisional Patent Application No. 60/217,628 for "WEB Browser Implemented In An Internet Appliance Using A Remote Control Unit for User Input."

FIELD OF THE INVENTION

This invention relates generally to a system and method for data entry, data editing, and hypertext navigation, and more particularly to data entry and navigation using a simple remote control.

BACKGROUND OF THE INVENTION

Access to the Web has thus far been limited to people who have access to a personal computer. Yet many people cannot afford the cost of even a relatively inexpensive personal computer, while others are unable or unwilling to learn the basic computer skills that are required to access the Web. Furthermore, Web browsers in the prior art generally do not provide the degree of user-friendliness desired by some people who lack computer experience, and many computer novices do not have the patience to learn how to use the software. Some people, for example, dislike an interface that requires them to identify hypertext objects and to use the point-and-click technique to browse through Web pages.

Most people, however, feel quite comfortable using a remote control to operate a television set. Therefore, it would be desirable to provide a means by which a person can access the World-Wide Web without the use of a personal computer. In particular, it would be desirable for a person to be able to access and navigate through Web pages using an ordinary television set and a remote control. It would further be desirable to have a user interface by which a person can use a remote control to navigate between hypertext objects on a Web page with minimal effort or thought, so that a person feels more as if he or she is simply changing television channels rather than utilizing a complex computer network.

It would also be desirable to provide a user interface permitting a person to input all the text and data for the set-top box without the use of a keyboard or any other device apart from the remote control unit and his voice. The need and desire to enter alphanumeric text through non-alpha or numeric remote control and voice is ever increasing.

In the United States of America it is standard for every telephone (both conventional and cellular) keypad to have letters as well as numerals displayed on the keys. Thus, the key representing the numeral "2" has the letters A, B and C displayed and the key representing the numeral "3" has the letters D, E and F etc. It is common to represent a telephone number by the letters, which correspond to the digits on the keypad of the telephone set. Thus, for example, a software company with the name "Uniqa KK" can acquire the telephone number 864-7255 and can advertise to customers that the company's telephone number can be dialed by activating the keys with the letters U-N-I-Q-A-K-K. Dialing these letters will result in only one digital sequence, but one digital sequence can be represented by many letter sequences.

Therefore a need exists to provide a user with a simple straightforward method and apparatus for inputting alphanumeric text through a non-alphanumeric or other device having fewer keys than the desired alphabet or through voice; and the need exists to provide a system that is not restrictive to direct correlation or a specialized domain, i.e. where a variety of choices are available and easily input.

SUMMARY OF THE INVENTION

These needs, and others that will become apparent, are met by the present invention which, in one embodiment is a system for entering text and data using only a remote control unit. The system includes a remote control unit for entering text and data, an Internet appliance providing a network connection, processing, and display and sound output, and an ordinary television set connected to the Internet appliance for interactively displaying a character set and the contents of a text buffer.

In another embodiment, the Internet appliance includes a language module permitting the display of all basic symbols for many text-based languages. When used with an appropriately marked remote control unit with a standard telephone keypad, the system is capable of being used by nearly anyone anywhere in any major text-based language.

In yet another embodiment, the system includes a microphone for voice input of text and data. The Internet appliance includes a speech module that recognizes alpha-numeric characters when spoken in a number of major languages and converts the spoken word into appropriate text and data for input to the text buffer.

The invention also includes a method for operating a text/data input system and hypertext navigation system through use of the remote control unit and, alternatively, voice input.

The system and method also provide for input of commonly used phrases, by displaying a separate page listing the phrases, for example, "http://", "www", ".com", and the like. In a specific embodiment of the system, the Internet appliance includes a process for detecting and correcting common invalid key stroke sequences.

DESCRIPTION OF THE PREFERRED EMBODIMENT

Figure 1:
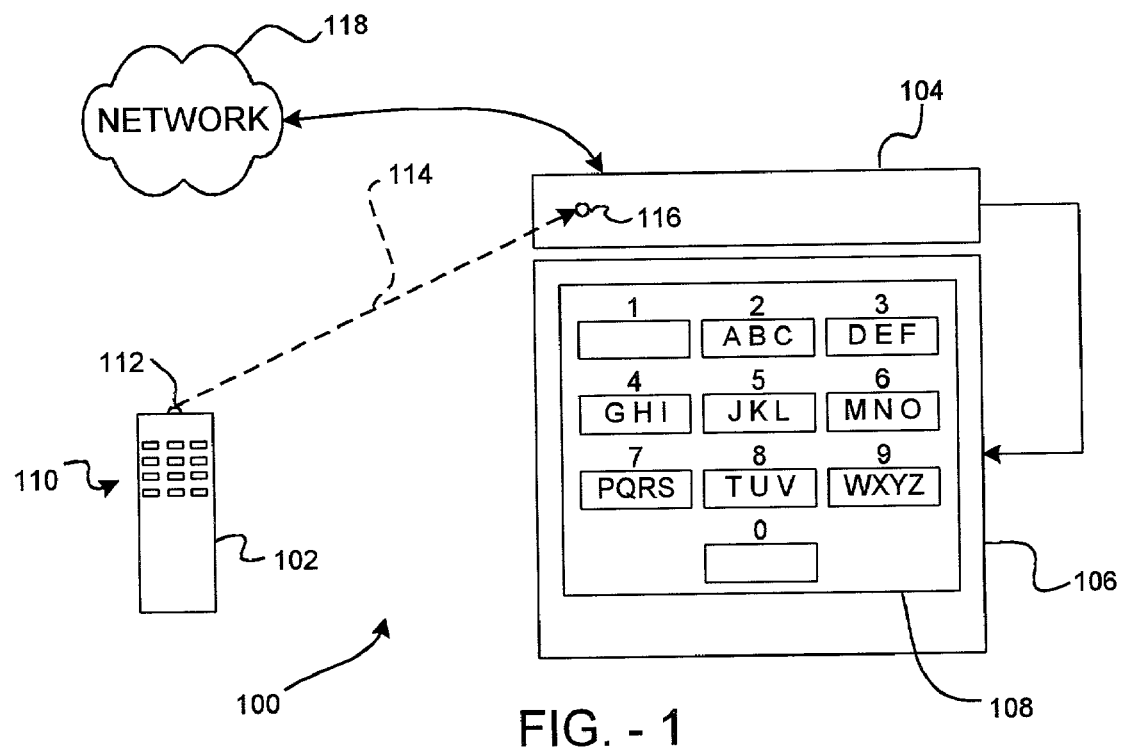
FIG. 1 is a schematic diagram that illustrates the major components of a text and data entry system according to one embodiment of the present invention.

The disclosures of each patent application and provisional patent application listed in the Related Applications section, above, are incorporated by reference herein.

Introduction

Internet access devices typically refer to devices that have limited computing and storage capabilities and are typically connected to a network such as the Internet to utilize the capabilities of other devices on the network. An "Internet appliance," as the phrase is used here, is a device that is capable of providing the full functionality of an Internet access device but has a compact structure and a simple user interface. In a preferred embodiment, the user interface is a remote control unit having a simple keypad with a limited set of numeric and function keys. Thus, although most functions performed by the Internet appliance can be performed by an ordinary PC, by other types of Internet access devices, and by a system of networked devices, the Internet appliance has a simple and compact structure. In particular, an Internet appliance that works with a reduced-key set user interface device with a minimum set of keys and voice inputs for user interface provides simplicity of operation and over-all ease of use.

The Internet appliance according to a specific embodiment of the present invention is a small device that includes a processing unit; a wired, or alternatively wireless network connection section such as a modem for communication with a network; a video section including a video signal output, such as a television interface for outputting video and audio signals, or separate video and audio signal outputs; and a user interface signal receiver for receiving user interface signals from a reduced-key set user interface device, such as a consumer-type remote control unit or voice input device. The above components are preferably contained in a housing or provided on the outside surface of the housing to form an integral unit. The processing unit is connected to the network connection section, the video section and user interface signal receiver and controls all functions of the Internet appliance. The reduced-key set user interface device is a device that has a small number of keys and transmits a small number of keystroke signals associated with the keys. As used in this specification, the term "reduced-keys user interface device" does not include a device that has a full text-entry keyboard. The video section can be connected to a display such as a television for displaying information, and the Internet appliance unit typically does not have its own video display or other graphic display devices in the interest of reducing the device size. The user interface signal receiver is the only device for receiving user interface information from the user (via the reduced-key set user interface device or voice input device), and the Internet appliance unit does not have its own keyboard input device with text-entry keys. The lack of an integral video display device and a keyboard allows the Internet appliance to have a compact structure. User interface is provided solely through the cooperation with video display and the reduced-key set user interface device and voice input device.

Several features may be added to most Internet appliances, although not required, including: an audio output, an audio input, a video input, and visual indicators. These features may be actual input and output devices such as a speaker, a microphone, and a video camera that are housed in the housing, if they can be made sufficiently compact. Alternatively, they may be input and output signal terminals provided on the housing for connecting with external devices such as speakers, microphones and video cameras. The audio and video inputs are used to capture and store voice and image information from the user. The audio output 16 may be used to produce a user-feedback sound such as a beep or click each time a user key press on the user interface device is received and processed. If a key press is received but ignored because it is currently invalid, the UI remains silent or make a different (error) sound. The visual indicators, such as an LED panel, are typically provided on the housing for providing the user with visual indications of system statuses. All of the individual components of the Internet appliances described above are known in the art and/or commercially available.

FIG. 1

FIG. 1 is a schematic diagram that illustrates the major components of a text/data input and hypertext navigation system according to one embodiment of the present invention. The system is designated generally by the reference numeral 100 and includes a remote control unit 102, an Internet appliance 104, a television set 106 having a display 108.

The remote control unit 102 includes a reduced keyset keypad, indicated generally by the numeral 110, and an infrared transmitter 112. In a specific embodiment, the reduced keyset keypad 110 is identical with a standard telephone keypad, having 12 keys arranged in a 4 by 3 array, numbered 0 through 9 and # and *. The alphabet is associated with the numbered keys in the same manner as the standard telephone keypad.

When a key is depressed, an infrared signal is transmitted 114 to an infrared receiver 116 located on the front of the Internet appliance 104. The Internet appliance converts the received transmission to corresponding symbols and displays these via the television display 108.

In a typical application, the Internet appliance 104 is connected to a communication network 118.

FIG. 2

Figure 2:
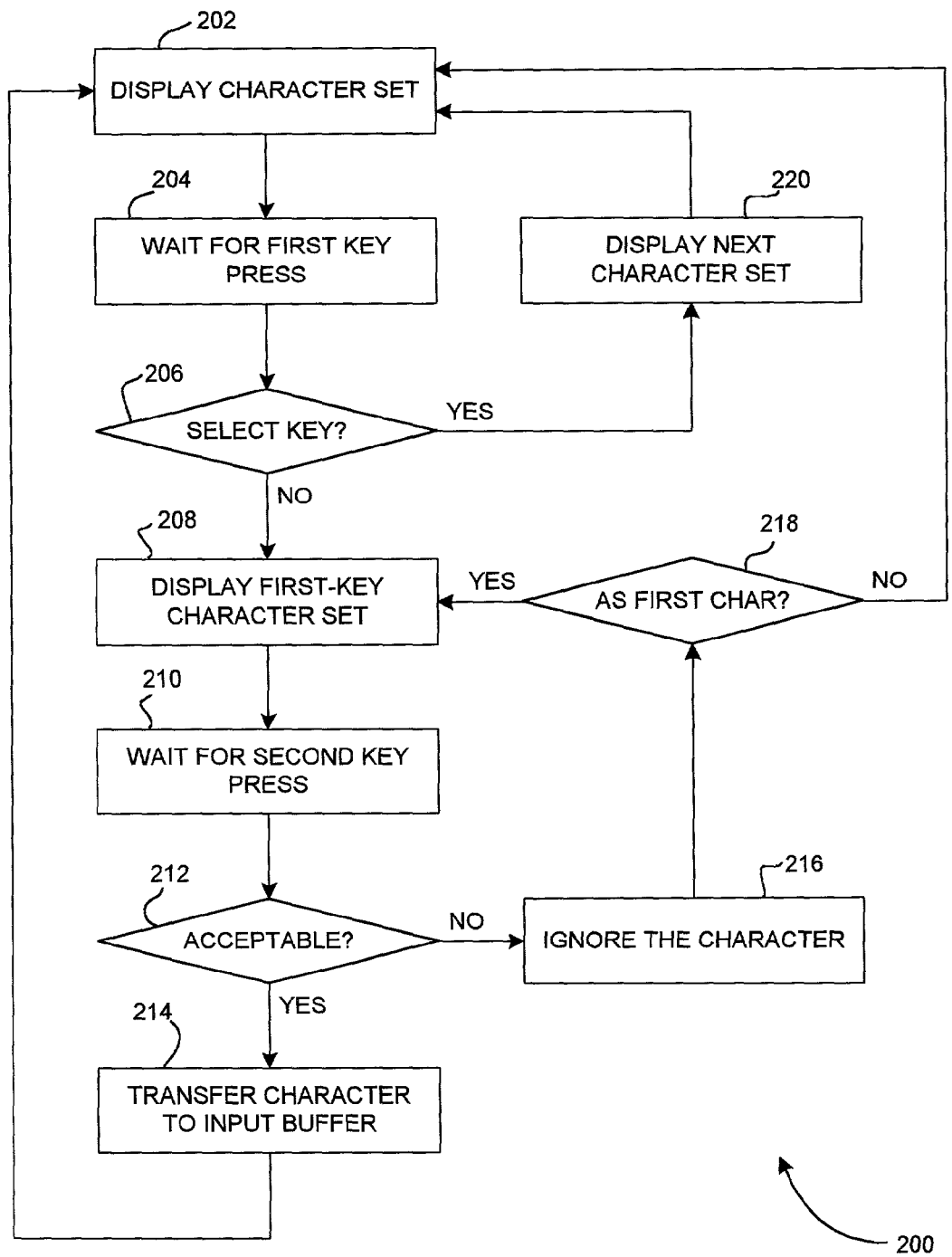
FIG. 2 is a process flow diagram illustrating a method for inputting alphanumeric text from a reduced keyset interface device such as a remote control unit.

FIG. 2 is a process flow diagram illustrating a method for inputting alphanumeric text from a reduced keyset interface device such as a remote control unit. Whenever a user depresses any key of the remote control unit 102 of FIG. 1, a Text entry method 200 is invoked. At an initial step 202 a selected character set is displayed on the television display 108 of FIG. 1. The process advances to a step 204 where it awaits a first key stroke. When a user depresses any key of the remote control unit 102 (FIG. 1), the key stroke is encoded and transmitted to the Internet appliance. If the key stroke is a numbered key "2" through "9", the character set corresponding to the numbered key is highlighted on the display, step 208. The method advances to step 210 and awaits a second key stroke. If the next key stroke corresponds to one of the highlighted characters, e.g., a "1" selects an "a", a "2" selects a "b", and a "3" selects a "c", the selected text character is transferred into an input buffer, step 214, else, no character is selected and at step 218 the key stroke is tested to determine whether it can be regarded as a valid first keystroke.

In a specific example of the method for text entry, the television display 108 shows a selected character set, step 202. When a user presses the button labeled "2" of the remote control unit, step 204, the characters "a-b-c" are highlighted on the displayed character set, step 206. At this point the user has five options, he can choose a, b, or c by pressing 1,2, or 3, step 208, or pressing the '*' key to discard the first selection, step 210, or any other numeric key in the remote control to discard the first key press and take the current inputted key to be the first key. If the first key is "SELECT" then it changes the character set, step 212, and shows the new character set and waits for the first key input.

FIG'S 3–9

Figure 3:
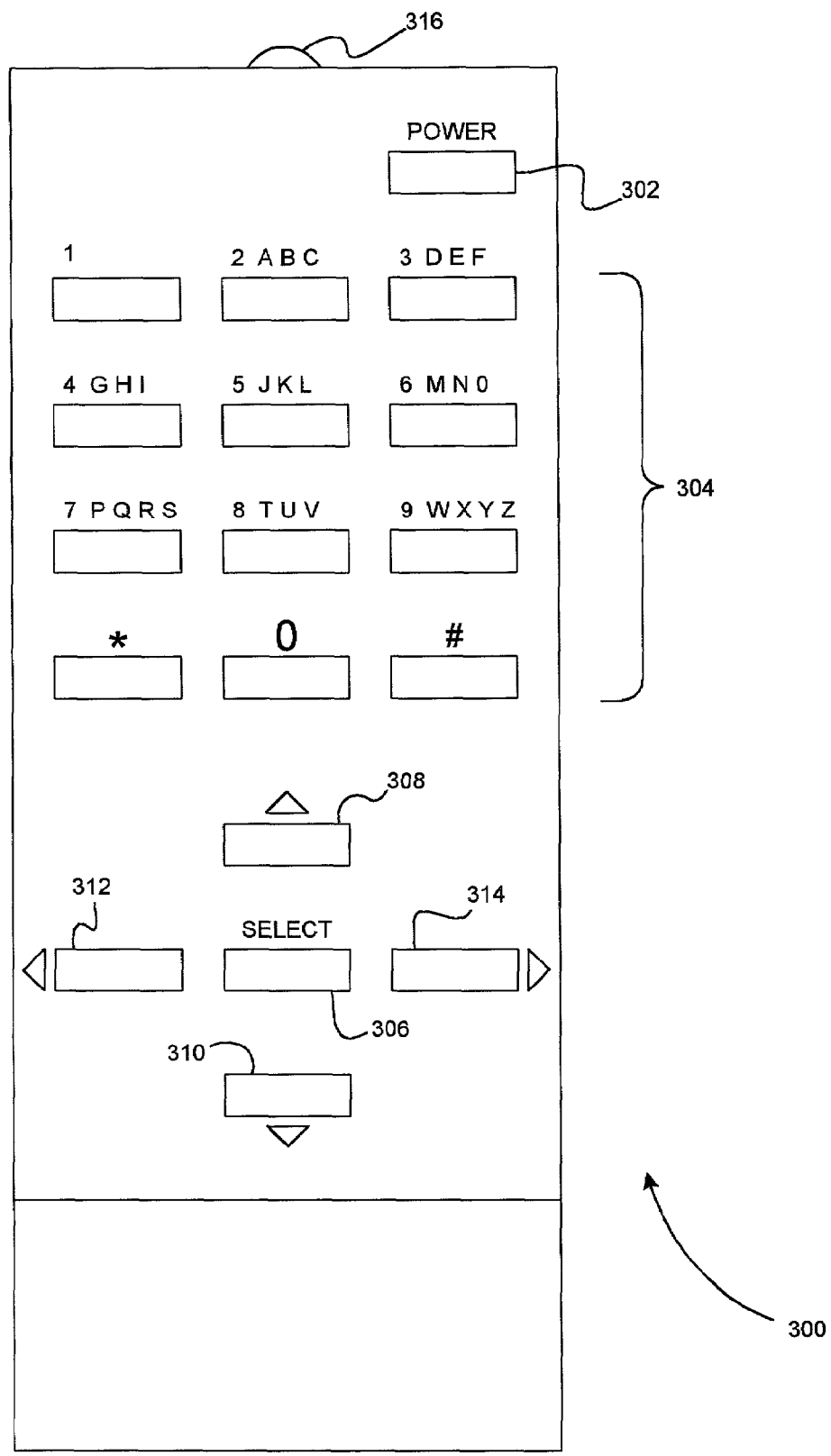
FIG. 3 is a plan view of a reduced keyset remote control unit for use with the system of FIG. 1.

FIG. 3 is a plan view of a reduced keyset remote control unit for use with the system of FIG. 1. The remote control unit is designated generally by the numeral 300, and includes a power switch 302, a standard telephone-type 12-key keypad, designated generally by the numeral 304, a SELECT key 306, and four navigation/edit keys; UP 308, DOWN 310, LEFT 312, and RIGHT 314. In a preferred embodiment the remote control unit 300 includes batteries for supplying operating power (not shown), and uses an infrared transmitter 316 for transmitting key stroke sequences to the Internet appliance.

The functions of the controls on the remote control unit 300 are summarized as follows. 'Power' button 302, causes the Internet appliance to power up and start to load the application, if "off", and to power down if "on". The 'Select' button 306 allows the user to select and execute the focused task or to change the modes. The number buttons 304 are used to enter numbers, text, for short cut access, and the like. Button '*' is always used to cancel, and button '#' is used for done, continue, etc. The navigation/edit buttons 308–314 are used for hypertext navigation and for input editing.

The advantage obtained over other text entry methods is that the text entry system works with all languages, separately and jointly. In a specific embodiment there are a plurality of mode pages (for example, FIG'S 5–9), which the user selects and uses during text entry.

Figure 4:
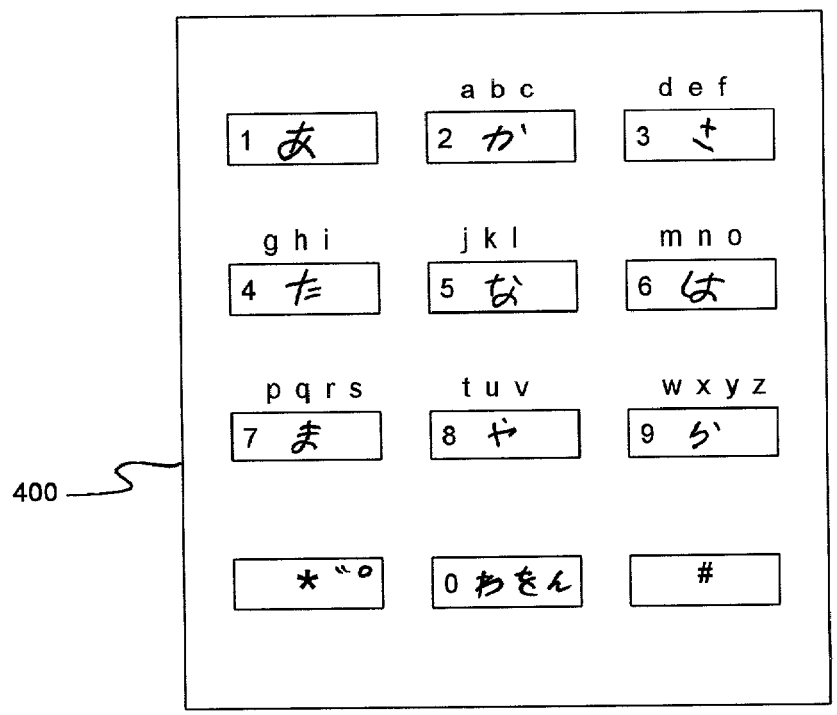
FIG. 4 is a plan view of a remote control unit keypad using a Japanese character set for text entry.
Figure 5:
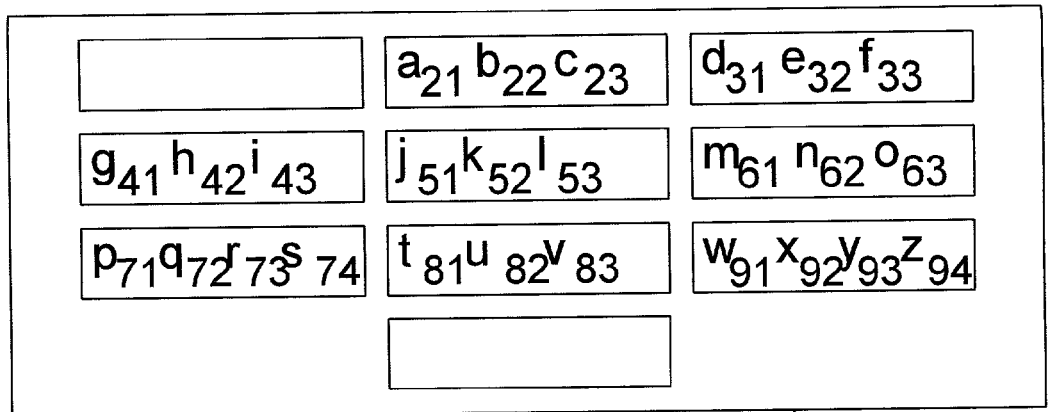
FIG. 5 illustrates a display of an English character set used for text entry.
Figure 7:
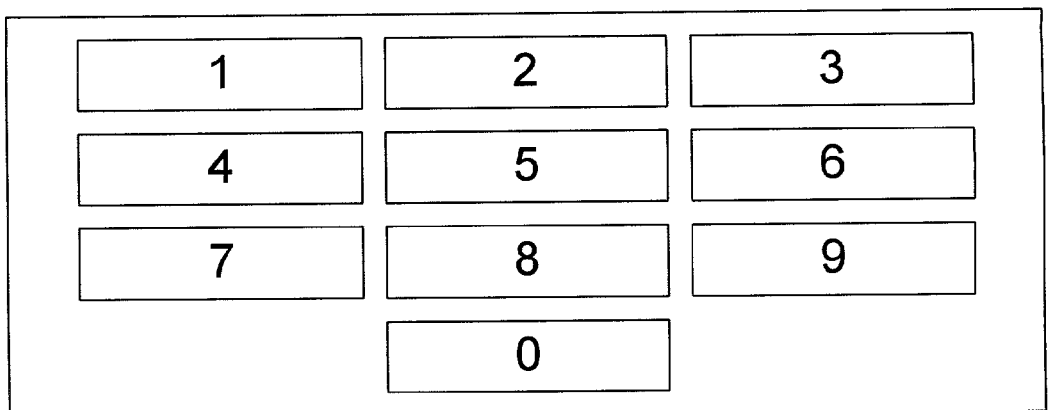
FIG. 7 illustrates a display of a number set used for text and data entry.
Figure 8:
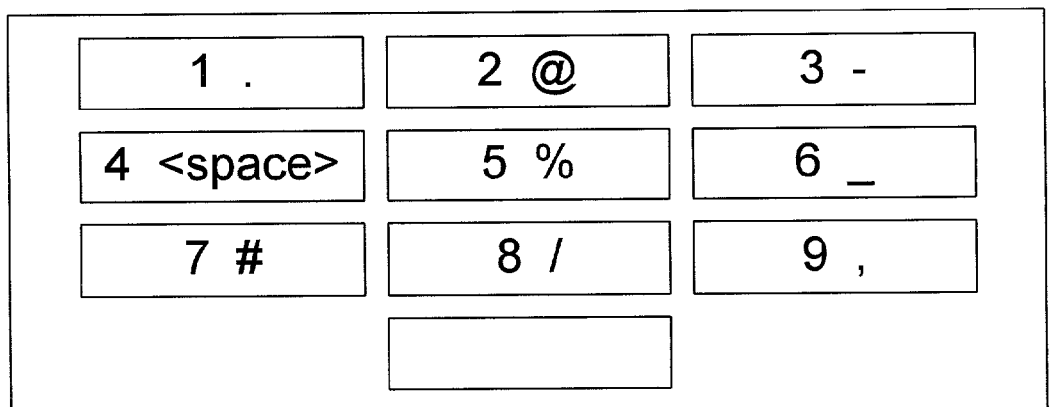
FIG. 8 illustrates a display of a special "symbols" character set for text and data entry.
Figure 9:
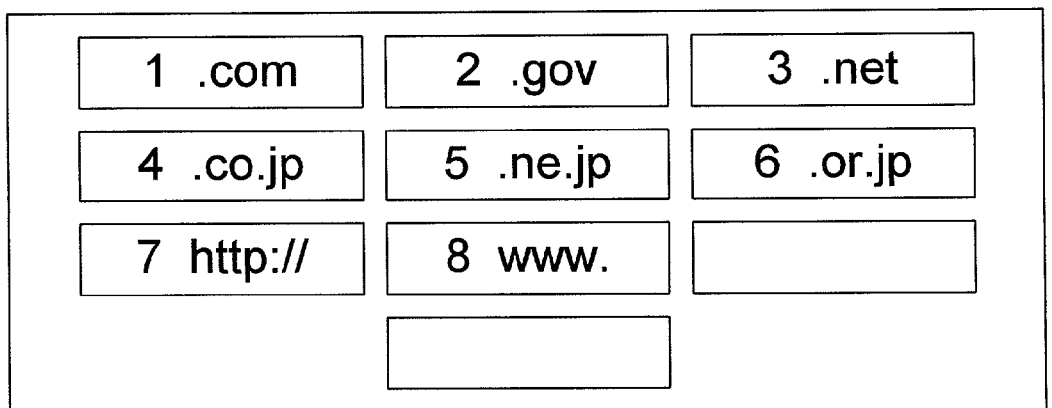
FIG. 9 illustrates a display of a special "shortcuts" character set for text and data entry.

A specific embodiment of the text entry system provides a set remote key assignment. In this embodiment, the 'Select' key acts as a mode changer. One mode is for digits, 700 of FIG. 7, another mode is for an English alphabet, 500 of FIG. 5 and 600 of FIG. 6, another mode is for Japanese characters, 400 of FIG. 4, another mode permits entry of predefined symbols, 800 of FIG. 8, and yet another mode allows the user to employ simple keystroke sequences to enter predefined frequently used shortcuts, 900 of FIG. 9. These shortcuts can be 'www.' 'http://', '.com', and the like. The '*' (star) and '#' (pound) keys are used for "cancel" and "done."

Upon the invocation of the Text entry process (FIG. 2), it can be initialized to any one of these modes. Pressing the SELECT key 306 (FIG. 3) of the remote control unit, results in a switch to the next available mode. While in Shortcut entry mode, pressing the SELECT key will switch to the Digit entry Mode. Each mode allows the user to enter a specific type of information.

In Digit entry mode (FIG. 7), the user can enter digits from 0 to 9. Each of these digits is mapped to a corresponding remote control unit key. For example, in this mode pressing remote control unit key "3" allows the user to enter the digit "3". If a user wants to write "9876543210", the user presses, in sequence, the keys 9-8-7-6-5-4-3-2-1-0.

In the English Alphabet entry Mode (FIG'S 5, 6), the user can enter alphabet characters from "a" to "z". In this mode, each alphabet is mapped to a sequence of remote control unit keys. This key mapping is identical to that for a standard telephone system. In this case, two numeric keys of the remote control are required to enter a single alphabet character. For example, pressing the remote control unit key "2" and then the remote control unit key "1" (21) allows the user to enter the alphabet character "a". To enter a word like "uniqa" requires the user to press the following key sequence: 8-2-6-2-4-3-7-2-2-1.

Figure 6:
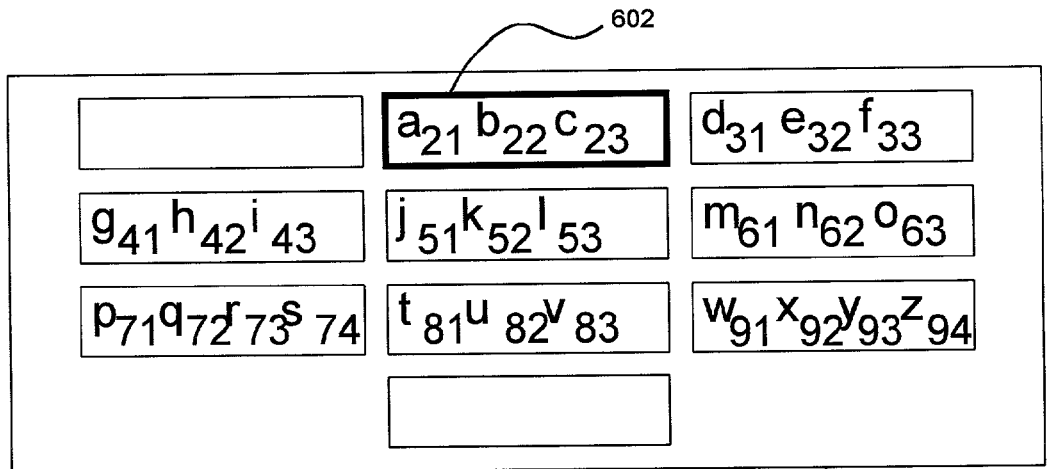
FIG. 6 illustrates a display of the English character set of FIG. 5 having the letter group "a, b, c" highlighted for emphasis.

In a preferred embodiment, the first keystroke "2" highlights the displayed group of letters "a-b-c" (602 of FIG. 6). A second keystroke of "1", "2", or "3" selects "a", "b", and "c", respectively. After the second keystroke, the highlight turns off and the display reverts to that of FIG. 5, waiting for a next "first" keystroke.

In another specific embodiment (not illustrated), letters of the alphabet are alternatively selected as follows: the letter "c" is selected by first pressing the "2" button, then pressing the "2" button an additional three times in rapid succession. To select the letter "u", press the "8" button a first time, then press the "8" button twice again in rapid succession. In this specific embodiment, a user can alternate between the two entry modes, using the mode that feels most natural at any moment. Thus the user can enter the alphabetic sequence "b" "a" "c" "k" by depressing the "2" key then the "2" key to select the "b", then depressing the "2" key followed by depressing the "1" key to enter the "a", then by depressing the "2" key and then rapidly depressing the "2" key three more times in succession to select the "c", and so on.

When in a multiple key stroke sequence mode such as an English alphabet text entry, If the second key stroke of any two-stroke sequence is invalid, the text entry process automatically checks to insure a valid sequence has been entered (test step 212, FIG. 2). When the second key stroke is invalid, the text entry process attempts to use the invalid key stroke as a first key stroke of a next character, discarding the previous incompletely specified character (steps 216, 218 of FIG. 2).

In Symbol entry mode (FIG. 8), a user can enter predefined symbols. In a specific embodiment, the total number of symbols available in this mode is less then 10. Hence, each of these symbols is mapped into a single numeric remote control unit key. For example, the symbol "." is mapped into the remote control unit numeric key "1", symbol "," is mapped into remote control unit numeric key "9", and the symbol "@" is mapped into number 2. When the number of required symbols increases beyond 10 symbols, a 2-stroke input protocol is followed. The most frequently used symbols are mapped into a single-stroke protocol overlayed on a 2-stroke protocol. For example the symbol "@" is mapped into remote control unit key "2" but new symbols like "A" are mapped into 2-stoke sequences using a different number key as the first stroke of the new sequence. For example, the "comma" and the "^" are mapped onto the "9" key such that the sequence 9-1 selects the comma, and the sequence 9-2 selects the new symbol "^".

In Shortcut entry Mode (FIG. 9), a user can enter predefined shortcuts. Shortcuts are frequently used strings of characters. As the Internet appliance also includes a browser, the shortcuts are mostly Internet oriented. For example, "http://", "www", ".com", ".net", and the like. The Shortcut entry mode has the same criteria as Symbol entry mode, i.e., when the total number of shortcuts is less then 10, each shortcut is mapped into a single stroke sequence. When the number of shortcuts exceeds 10, a 2-stroke key sequence is used, and frequently used shortcuts are mapped to single keystroke sequences.

Any other language mode, if the character set has less than 100 characters, it will work in the same method as the English Alphabet entry mode and have 2 sequence of key presses associated with a character. If the character set has more than 100 characters, then each character will be mapped into 3 sequential key presses.

Since the mid 1950s, a standard phonetic representation of Chinese characters has been adopted known as "pinyin". The pinyin for each Chinese character, like each English word, is made up from combinations of the 26 letters of the Roman alphabet a–z. So a pinyin based Chinese remote control data entry device can have the same keypad layout as that shown in FIG. 3.

Apart from these data entry mechanisms, the Text entry mechanism also provides some editing capabilities. It allows a user to delete text, character by character. The remote control unit (300, FIG. 3) directional key UP 308 is used to delete the character immediately before the cursor. The directional key DOWN 310 is used to un-delete the character deleted immediately before the cursor. The LEFT and RIGHT directional keys, 312 and 314 respectively, are used to move the cursor in the left and right directions, respectively, in a text string without deleting characters.

FIG. 10

Figure 10:
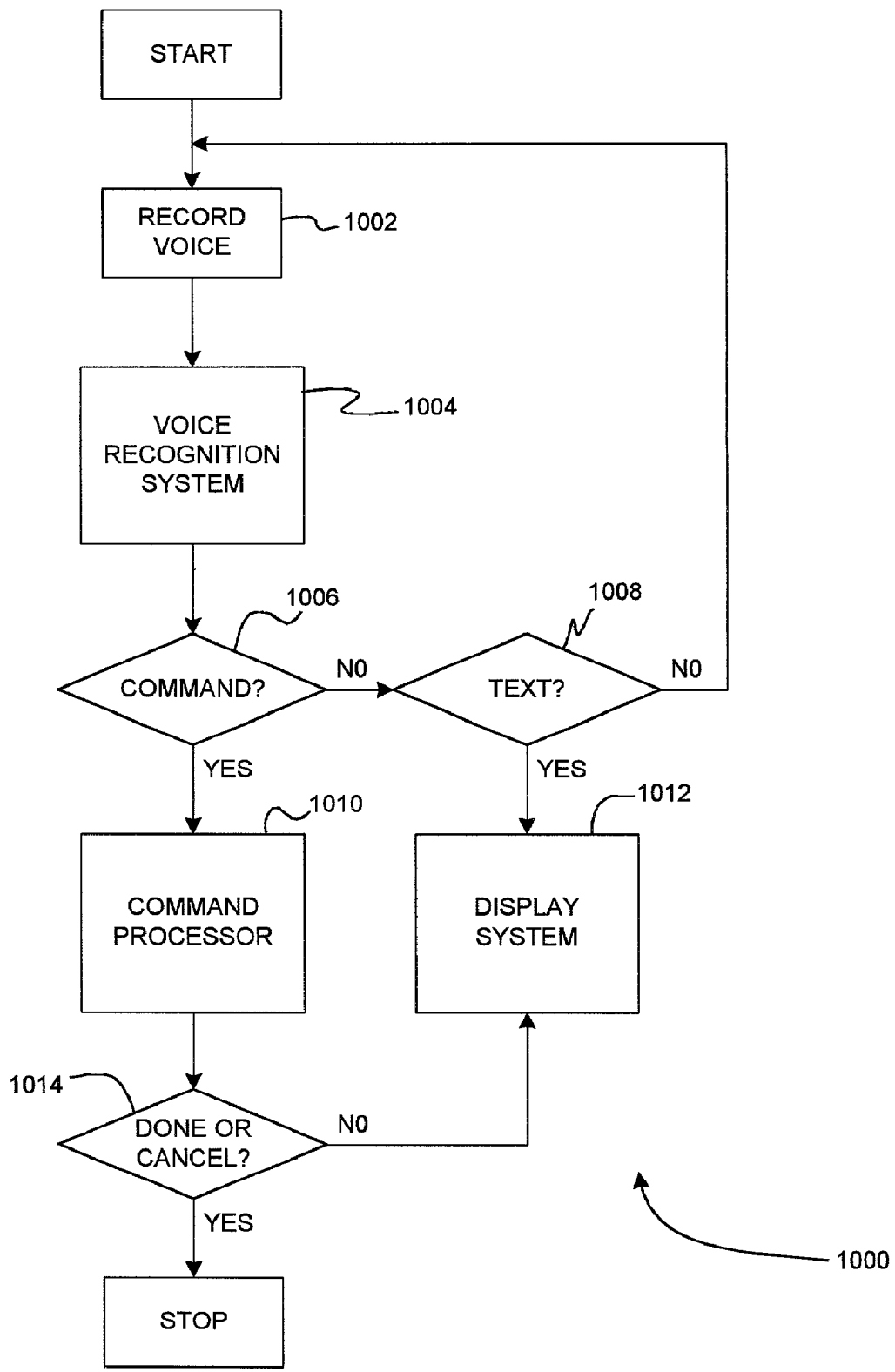
FIG. 10 is a process flow diagram illustrating a method using voice recognition for text entry, editing and for hypertext navigation.

FIG. 10 illustrates a Voice input based text entry method. The Voice input process is designated generally by the reference numeral 1000, and includes a step 1002 for recording a voice input, a step 1004 for parsing the recorded input into an identifiable text character or command, test steps 1006 and 1008 for separating text characters and commands, a step 1010 for executing a command, a step 1012 for displaying an identified text character, and a test step 1014 for responding to a "cancel" or "done" command.

Whenever a system user pronounces a letter or number or a predefined word, a voice input device records the sound 1002, and sends the recorded voice to a simple voice recognition system 1004. The voice recognition system 1004 analyses the recorded voice and then attempts to determine which letter or number or predefined word best fits the recorded voice 1002. The voice recognition system 1004 then transmits the recognized letter or number or the predefined word to the display system 1012. The display system 1012 shows the letter or number or the predefined word on the display screen.

Letter and Number Entry

The user pronounces a letter from an alphabet of 'A' to 'Z', or pronounces a number from '0' to '9'. The recorded voice 1002 for the letters and numbers are transmitted to the voice recognition system 1004.

Special Symbol Entry

The user pronounces the name of a special symbol such as "space", "comma", "plus", "minus", "hyphen", "percent", "underscore", "pound", "slash", "full stop", "at the rate", and the like. The recorded voice 1002 is transmitted to the voice recognition system 1004.

Predefined Word Entry

The user pronounces a predefined word such as "dot-com", "dot-gov", "dot-net", "dot-co-dot-jp", "dot-ne-dot-jp", "dot-or-dot-jp", "http://", "www-dot", "select", "done", "cancel", "up", "down", "delete", "undo", and the like. The recorded voice 1002 is transmitted to the voice recognition system 1004. The voice recognition system analyses the voice and attempts to determine whether the predefined word is a text or a command and accordingly transmits the word or command to the display system. The display system shows the word or performs the command, as appropriate.

FIG. 11

Figure 11:
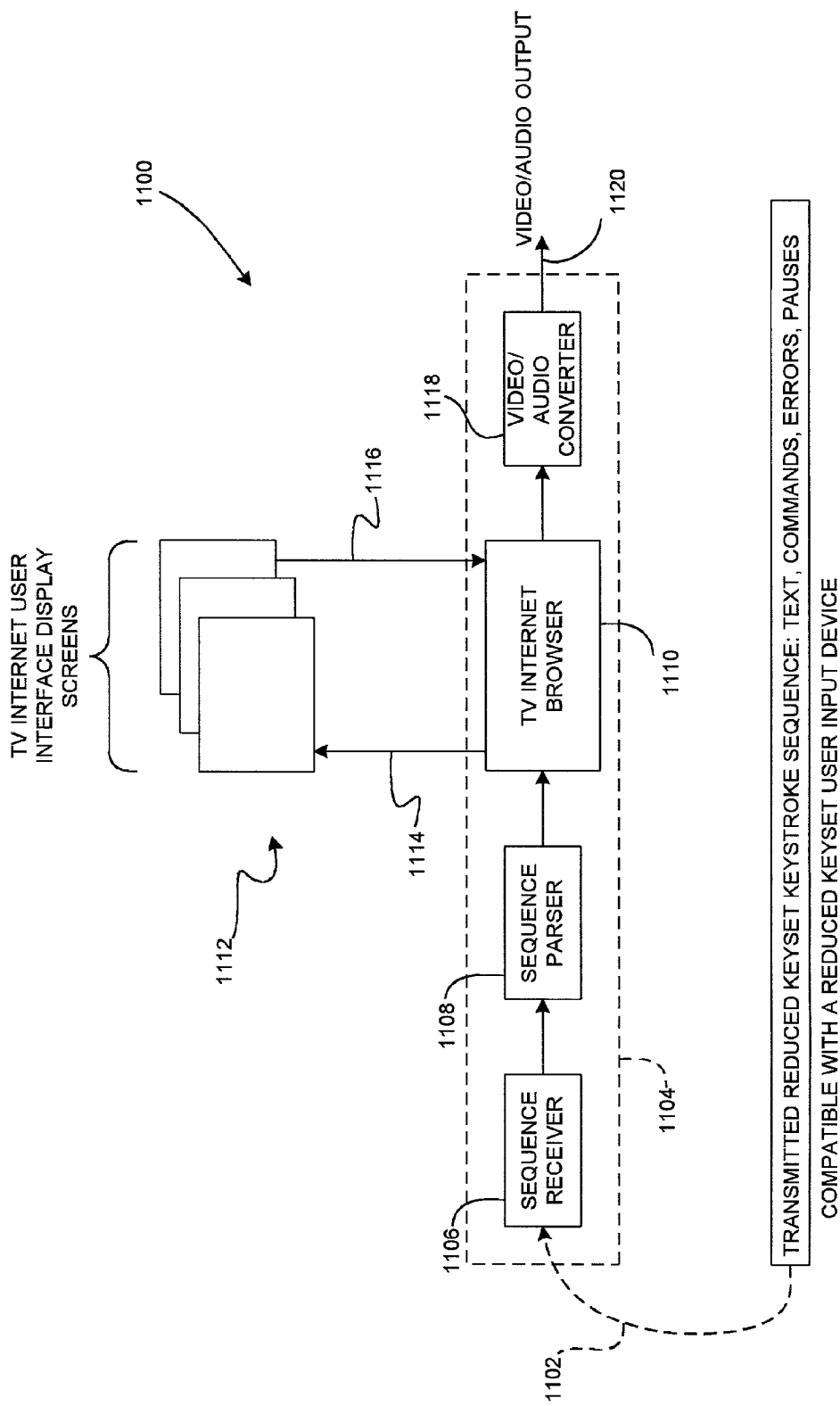
FIG. 11 is a schematic diagram that illustrates a reduced keyset user interface according to another aspect of the present invention.

FIG. 11 is a schematic diagram that illustrates a reduced keyset user interface according to another aspect of the present invention. The user interface is designated generally by the reference numeral 1100 and includes a transmitted reduced keyset keystroke sequence 1102, an Internet appliance 1104, a keystroke sequence receiver 1106, a sequence parser 1108, a TV Internet browser 1110, user interface display screens 1112, hypertext navigation of the display screens 1114, 1116, a TV Internet video/audio output converter 1118, and video/audio output signals 1120.

The reduced keyset keystroke sequence is created by a user employing a hand-held input device such as a remote control unit (FIG. 3). In a preferred embodiment, the keystroke sequence 1102 is transmitted as an infrared light beam and is received by an infrared detector/receiver 1106. The transmitted reduced keyset keystroke sequence 1102 includes text, commands, error sequences, and pauses. In another specific embodiment, the keystroke sequence 1102 is transmitted by a standard cellular telephone, and the receiver 1106 is compatible with the cellular transmission.

In a preferred embodiment, an Internet appliance 1104 includes the sequence receiver 1106, the sequence parser 1108, the TV Internet browser 1110, the video/audio converter 1118, and provides the video and audio output signals 1120 for connection to a standard television receiver (not shown). The TV Internet user interface display pages with hyperlinks 1112 are created and stored at a proprietary system server (not shown). The Internet appliance 1104 accesses and navigates the display screens 1112 via a connection to the Internet that defines a client (Internet appliance 1104)/server relationship. The features on the display screens define hyperlinks that permit the user to navigate the screens and make selections of displayed services.

Therefor, in one embodiment, the invention defines a reduced keyset user interface 1100 including a transmitted reduced keyset keystroke sequence 1102, a receiver 1106 for receiving the transmitted keystroke sequence, a parser 1108 for parsing the received sequence (FIG. 2), a browser 1110 for accessing user interface display screens 1112, and a video/audio converter 1118 for converting a user interface display screen and audio component for output to a standard television receiver.

The user interprets the displayed screen(s) and uses the hand-held reduced keyset input device to create keystroke sequences that navigate the screen(s), make selections from displayed options, and input and edit alphanumeric text, special symbols, and shortcuts.

FIG. 12

Figure 12:
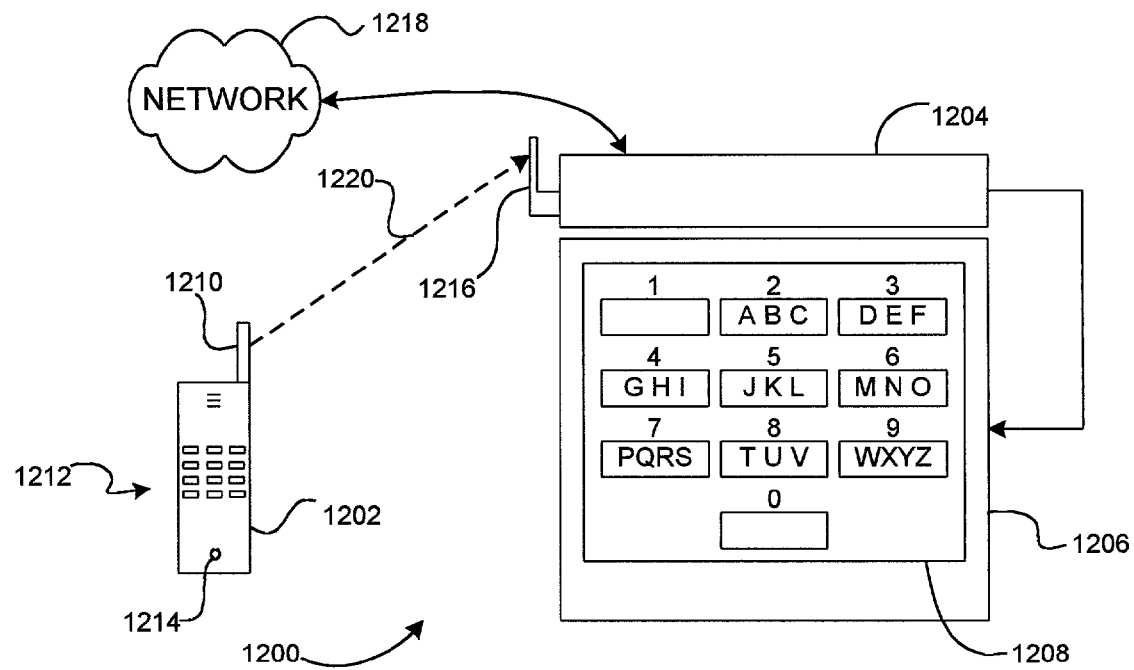
FIG. 12 is a schematic diagram that illustrates a text and data entry system using a cell phone as an input device.

FIG. 12 is a schematic diagram that illustrates a text and data entry system 1200 that uses a cellular telephone (any wireless phone) as an input device, according to a specific embodiment of the invention. The system 1200 includes a wireless phone 1202, an Internet appliance 1204, a standard television receiver 1206, a user interface display screen 1208, a wireless phone antenna 1210, a wireless phone 12-key keypad 1212, a wireless phone microphone 1214, an Internet appliance antenna 1216, a communications network 1218, and a wireless phone transmission 1220.

The system 1200 permits input by voice via the microphone 1214, and by reduced keyset keystrokes via the keypad 1212. The Internet appliance 1204 includes a receiver compatible with the transmission 1220 of the wireless phone 1202. The output of the receiver is directed to text parsing (FIG. 2) when input is via the keypad 1212, and is directed to voice parsing (FIG. 10) when input is via the microphone 1214.

FIG. 13

Figure 13:
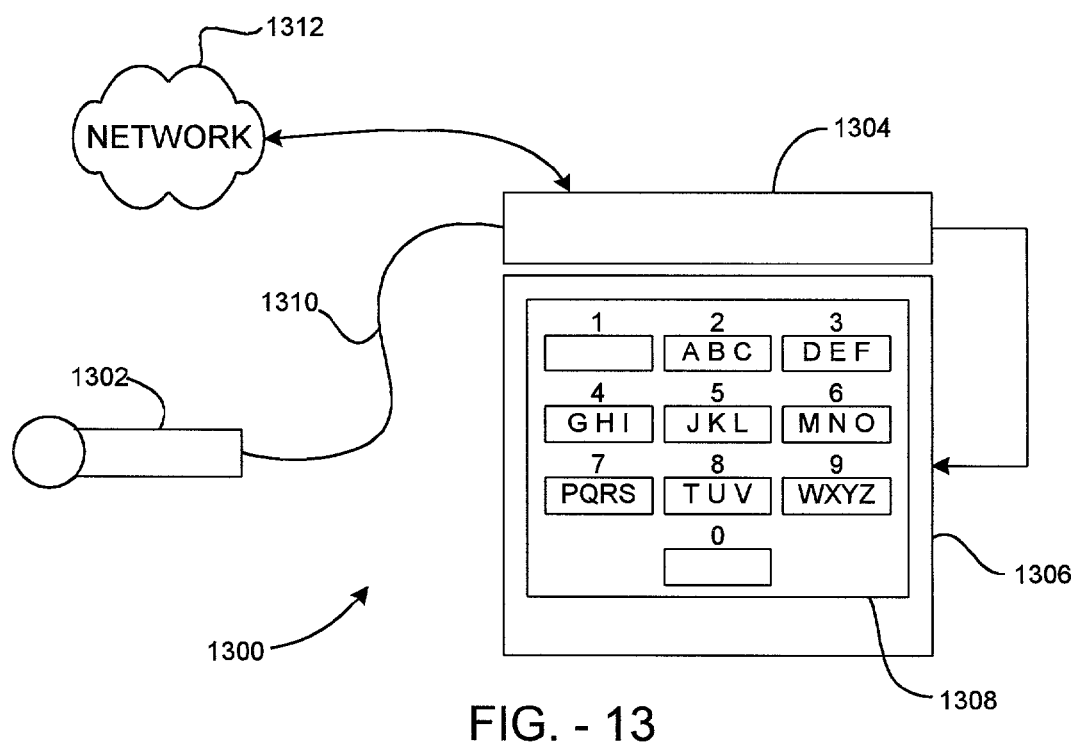
FIG. 13 is a schematic diagram that illustrates a text and data entry system using a handheld microphone as an input device.

FIG. 13 is a schematic diagram that illustrates a text and data entry system 1300 that uses a hand-held microphone as a user input device, according to another specific embodiment of the invention. The system 1300 includes a hand-held microphone 1302, an Internet appliance 1304, a standard television receiver 1306, a user interface display screen 1308, a microphone cable 1310, and a communications network 1312.

User input is via the hand-held microphone 1302, and the Internet appliance 1304 includes circuits for receiving a voice input stream. The received voice input stream is forwarded to a voice parsing module (FIG. 10) for conversion, use and display.

While the invention has been described in relation to the embodiments shown in the accompanying Drawing figures, other embodiments, alternatives and modifications will be apparent to those skilled in the art. It is intended that the Specification be exemplary only, and that the true scope and spirit of the invention be indicated by the following claims.

The invention claimed is:

1. A system for text entry, text editing, and hyperlink navigation, comprising:
    a reduced keyset keystroke sequence;
    a keystroke sequence receiver for receiving the sequence;
    a keystroke sequence parser for parsing the received sequence;
    an input text buffer for receiving the parsed sequence;
    storage means for storing and retrieving user interface display screens;
    a browser for accessing the display screens;
    a video output converter for converting an accessed display screen for display on an ordinary television set;
    the accessed display screen including a hyperlink for option selection and for display screen navigation,
    whereby a user enters a keystroke sequence for entering text, for editing text, for selecting displayed options, and for navigating the user interface display screens.

2. The system of claim 1 further including a reduced keyset user input device.

3. The system of claim 1 further including display means connected to the video output converter for displaying an accessed user interface display screen.

4. The system of claim 1 further including communication network means permitting the storage means to be connected to the browser via a communications network.

5. The system of claim 4 wherein the sequence receiver, the sequence parser, the browser, the video output converter, and the communication network means define an Internet appliance.

6. The system of claim 1 wherein the reduced keyset keystroke sequence defines text entry.

7. The system of claim 6 further including a first text input made in which each letter of the alphabet is defined as a two-keystroke sequence.

8. The system of claim 7 wherein the letters are define by the following sequences: the letter "a" by the sequence "2-1", the letter "b" by the sequence "2-2", the letter "c" by the sequence "2-3", the letter "d" by the sequence "3-1", and so on for the following correspondences: the letters "a-b-c" corresponding to sequences starting with the number "2", "d-e-f" with the number "3", "g-h-i" with the number "4" and so on as the letters of the alphabet correspond to the numbered keys of a standard telephone keypad.

9. The system of claim 6 further including a second text input mode in which each letter of the alphabet is defined as follows: the letter "a" by the sequence "2", the letter "b" by the sequence "2-2", the letter "c" by the sequence "2-2-2", the letter "d" by the sequence "3", the letter "e" by the sequence "3-3", and so on as the letters of the alphabet correspond to the numbered keys of a standard telephone keypad, and wherein the input sequence consists of a number of presses of the key corresponding to the letter being input, and wherein the number of presses of the specific key corresponds to the position of the letter within the letter group.

10. The system of claim 1 wherein the reduced keyset keystroke sequence defines special symbol input.

11. The system of claim 1 wherein the reduced keyset keystroke sequence defines a shortcut input.

12. The system of claim 2 wherein the reduced keyset user input device defines a hand-held remote control unit transmitting the keystroke sequence using an infra-red transmitter.

13. The system of claim 12 wherein the keystroke sequence receiver is adapted for receiving an infra-red transmission.

14. The system of claim 2 wherein the reduced keyset user input device defines a standard wireless telephone transmitting the Keystroke sequence using a radio signal.

15. The system of claim 14 wherein the keystroke sequence receiver is adapted for receiving a standard wireless telephone transmission.

16. The system of claim 1 further including the keystroke sequence receiver being adapted to accept a microphone input, and the system also including voice recognition means for converting the microphone input to the parsed keystroke sequence.

17. The system of claim 16 wherein the voice recognition means converts a plurality of spoken languages limited to spoken digits.

18. The system of claim 16 further including microphone means for inputting spoken digits.

19. The system of claim 18 wherein the microphone means includes one of a microphone, a standard telephone, and a wireless telephone.

20. The system of claim 5 wherein the Internet appliance includes microphone input means for receiving a reduced keyset keystroke sequence in the form of spoken digits.

* * * * *